(12) United States Patent
Lin

(10) Patent No.: US 9,038,661 B2
(45) Date of Patent: May 26, 2015

(54) VALVE DEVICE

(71) Applicant: Cheng-Yu Lin, Taichung (TW)

(72) Inventor: Cheng-Yu Lin, Taichung (TW)

( * ) Notice: Subject to any disclaimer, the term of this patent is extended or adjusted under 35 U.S.C. 154(b) by 147 days.

(21) Appl. No.: 13/727,279

(22) Filed: Dec. 26, 2012

(65) Prior Publication Data

US 2013/0220455 A1 Aug. 29, 2013

(30) Foreign Application Priority Data

Dec. 27, 2011 (TW) .............................. 100224742 U

(51) Int. Cl.
*E03F 5/04* (2006.01)
*E03C 1/28* (2006.01)
*E03C 1/12* (2006.01)
*F16K 31/122* (2006.01)

(52) U.S. Cl.
CPC ... *E03C 1/28* (2013.01); *E03C 1/12* (2013.01); *F16K 31/1221* (2013.01); *E03F 5/0407* (2013.01); *E03F 2005/0417* (2013.01)

(58) Field of Classification Search
CPC .............. E03C 1/12; E03C 2001/1206; E03C 2001/1213; E03C 1/28; E03F 5/047; E03F 2005/0417; F16K 31/12; F16K 31/122; F16K 31/1221

USPC ........ 251/12, 118, 127; 4/679, 680, 681, 688, 4/287; 137/511, 532, 544, 549, 550, 189, 137/190, 401, 404

See application file for complete search history.

(56) References Cited

U.S. PATENT DOCUMENTS

| | | | | |
|---|---|---|---|---|
| 5,249,398 A * | 10/1993 | Spanberg | ..................... | 52/169.5 |
| 5,662,138 A * | 9/1997 | Wang | ........................... | 137/433 |
| 6,318,397 B1 * | 11/2001 | Huber et al. | ................ | 137/15.19 |
| 6,319,397 B1 * | 11/2001 | Su et al. | ........................ | 210/163 |
| 6,589,440 B2 * | 7/2003 | Atwill | ............................... | 4/301 |
| 6,701,541 B2 * | 3/2004 | Romagna et al. | ................. | 4/301 |
| 2007/0174960 A1 * | 8/2007 | Lee | .................................... | 4/679 |
| 2008/0017562 A1 * | 1/2008 | Tripodi et al. | ................ | 210/163 |

* cited by examiner

*Primary Examiner* — Craig Schnedier
*Assistant Examiner* — Ian Paquette
(74) *Attorney, Agent, or Firm* — Muncy, Geissler, Olds & Lowe, P.C.

(57) ABSTRACT

A drain valve device includes a base and a control unit removably disposed in the base. The control unit includes a valve and a resilient component positioned between the valve and the base. The drain valve device opens automatically as soon as water entering the base exceeds a predetermined level. The drain valve device shuts automatically as soon as water entering the base is less than a predetermined level. The drain valve device has advantages, namely simple structure, convenient of use, prevention of intrusion of odor and pests, easy to clean, and unlikely to get clogged.

11 Claims, 15 Drawing Sheets

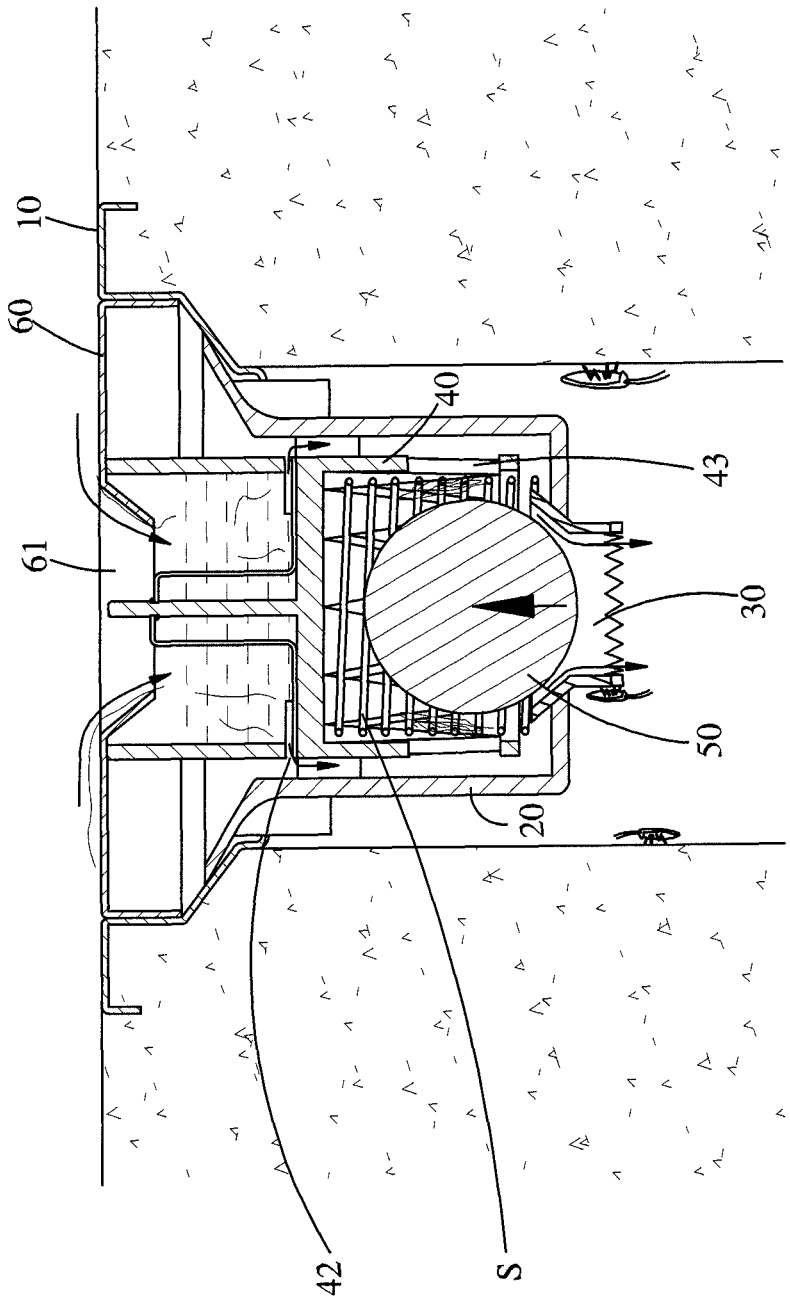

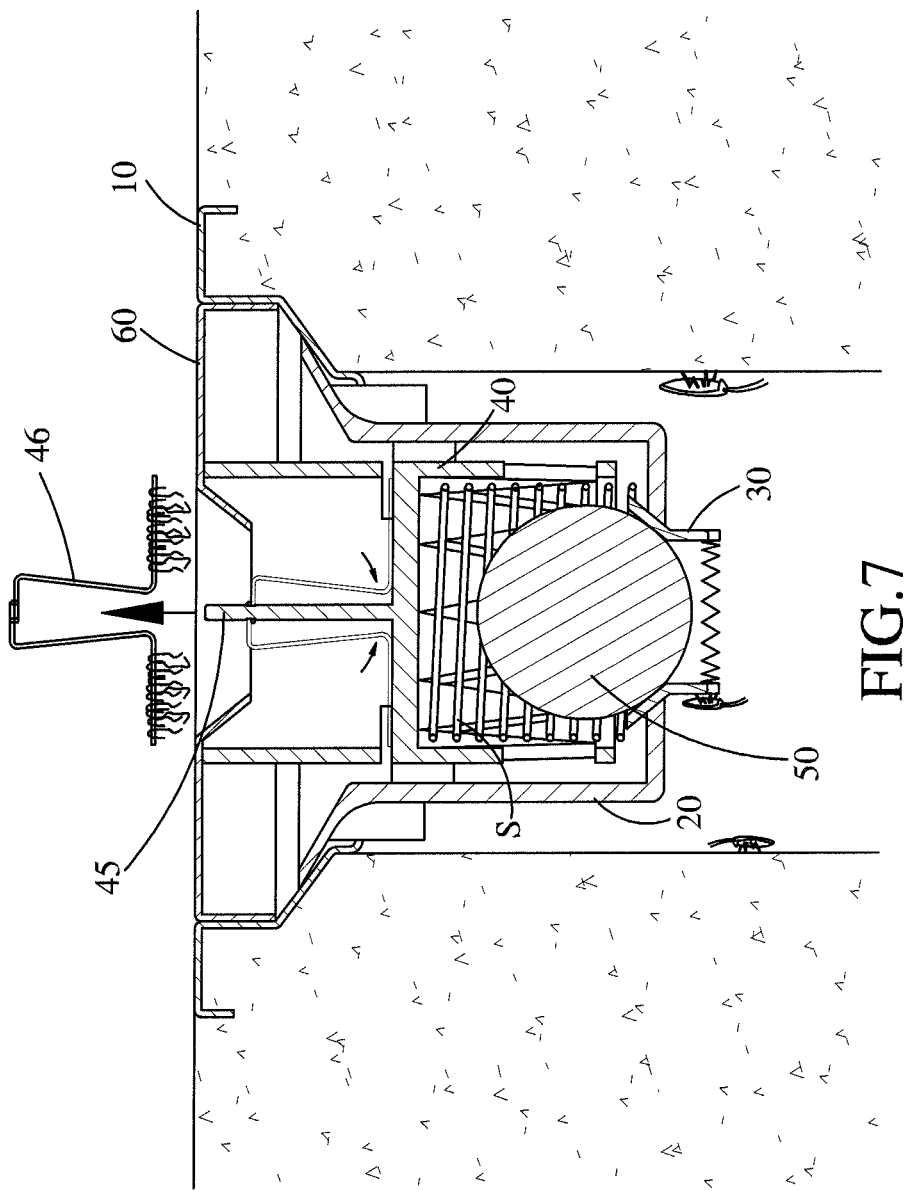

VALVE DEVICE

BACKGROUND OF THE INVENTION

1. Technical Field

The present invention relates to plumbing set forth in subclass E03C of the International Patent Classification (IPC), and more particularly, to a drain valve device capable of eliminating drain odor, and blocking intrusion of pests, such as cockroaches and mosquitoes, and effective in removing trapped hair and residue.

2. Description of Related Art

Referring to FIG. 1, a conventional floor drain structure comprises a water-collecting recess 1 and a plate strainer 2. A plurality of perforations 3 is disposed across the surface of the plate strainer 2 and adapted to filter out leftovers, hair, and residue. Not only is the water-collecting recess 1 in direct communication with a drainpipe, but the perforations 3 of the plate strainer 2 are also open fully; hence, odor builds up in the drainpipe and seeps into the house through the perforations 3 readily. Furthermore, the end section of the drainpipe is exposed outdoors; as a result, pests, such as cockroaches and mosquitoes, are likely to intrude into the house and thereby cause diseases, such as Dengue fever, to the household. Hence, the aforesaid drawbacks of the conventional floor drain structure pose a threat to home hygiene and remain unsolved.

Various odor-proof floor drain structures developed by manufacturers are not free from drawbacks, namely not effective in filtration, not convenient to clean, and not durable, and thus the prior art still has room for improvement.

SUMMARY OF THE INVENTION

In view of the aforesaid drawbacks of the prior art, it is an objective of the present invention to provide a drain valve device for shutting a drain vent to thereby achieve enhanced pest-proofing and odor-proofing.

Another objective of the present invention is to provide a drain valve device which is easy to clean and unlikely to get clogged.

In order to achieve the above and other objectives, the present invention provides a drain valve device, comprising: a base being hollow, cylindrical and having a bottom at which at least one through hole is disposed; a cover disposed at the base and having a drain vent; and a control unit comprising a hollow cylindrical valve, the valve having a top rim corresponding in position to the drain vent, wherein a baffle board is disposed in the valve to partition an inside thereof into a water storage space above and a receiving space below, the receiving space receiving a resilient component pressing against the baffle board and the base and held therebetween such that, as soon as an amount of water entering the water storage space exceeds a predetermined level, a resilient force of the resilient component is counterbalanced to thereby allow the valve to move downward and away from the cover, the resilient component being a compression spring with a spring constant of $2 \times 10^{-3}$ to $3 \times 10^{-3}$ kgf/mm.

Compared with the prior art, the present invention has advantages as follows: the drain valve device is structurally simple; the drain valve device features ease of use, because as soon as the amount of water entering a base through drain holes of a cover exceeds a predetermined level, the drain valve device opens automatically to allow the water to be discharged from the base; and drain valve device is effective in filtration to prevent hair and residue from gaining direct access to a drainpipe and thereby prevent the drainpipe from getting clogged.

BRIEF DESCRIPTION OF THE DRAWINGS

FIG. 6a is a schematic view of the drain valve device according to the first embodiment of the present invention, illustrating a mode of draining water with the drain valve device;

FIG. 7 is a schematic view of the drain valve device according to the first embodiment of the present invention, illustrating how the drain valve device is cleaned;

DETAILED DESCRIPTION OF THE EMBODIMENTS OF THE INVENTION

Figure 1:
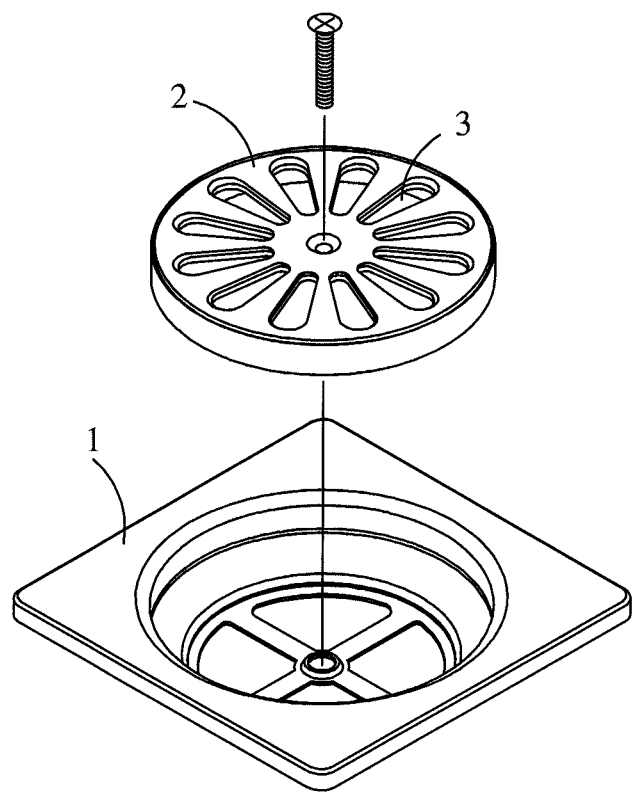
FIG. 1 is an exploded view of a conventional floor drain structure.
Figure 2:
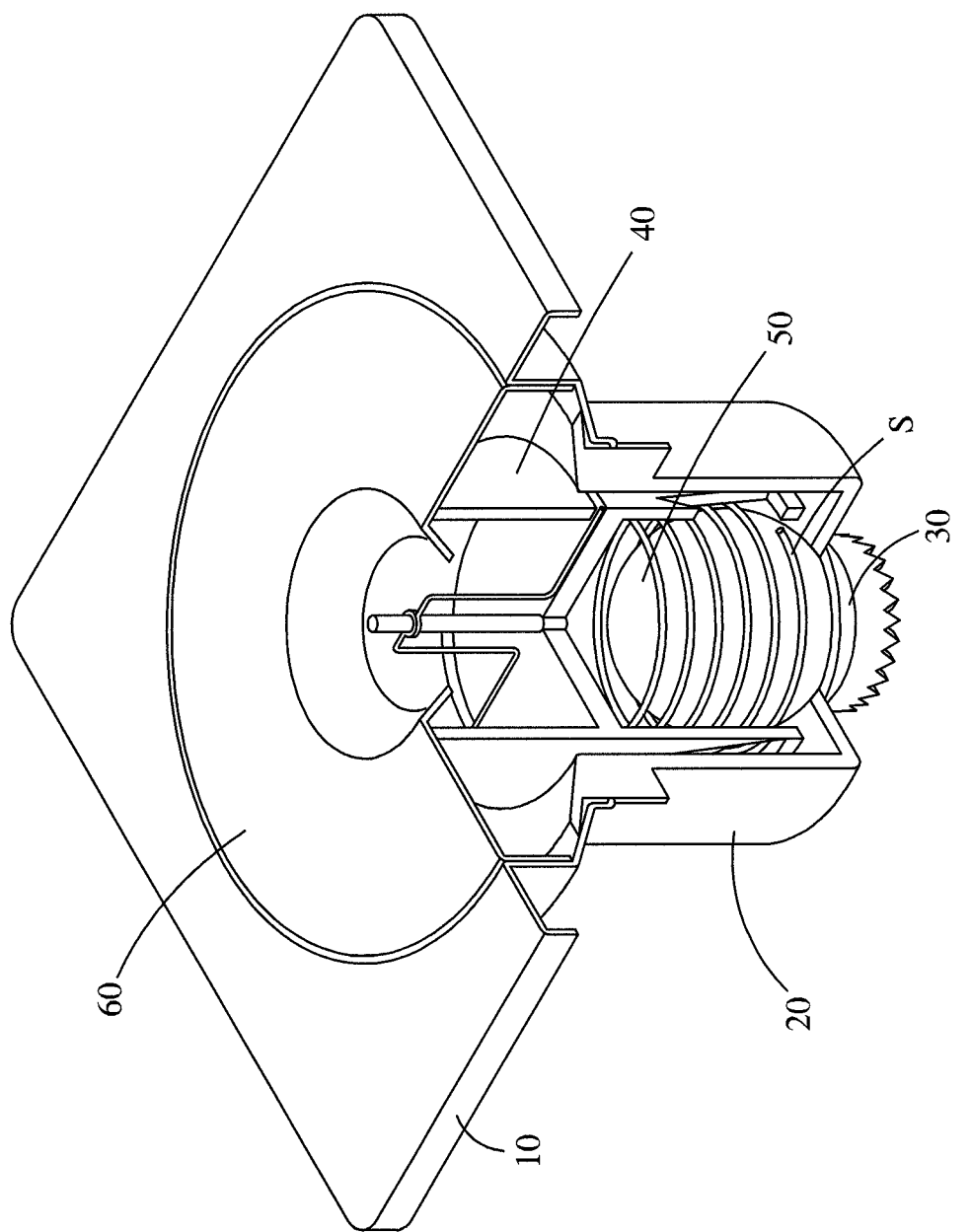
FIG. 2 is a cutaway view of a drain valve device assembled according to the first embodiment of the present invention.
Figure 3:
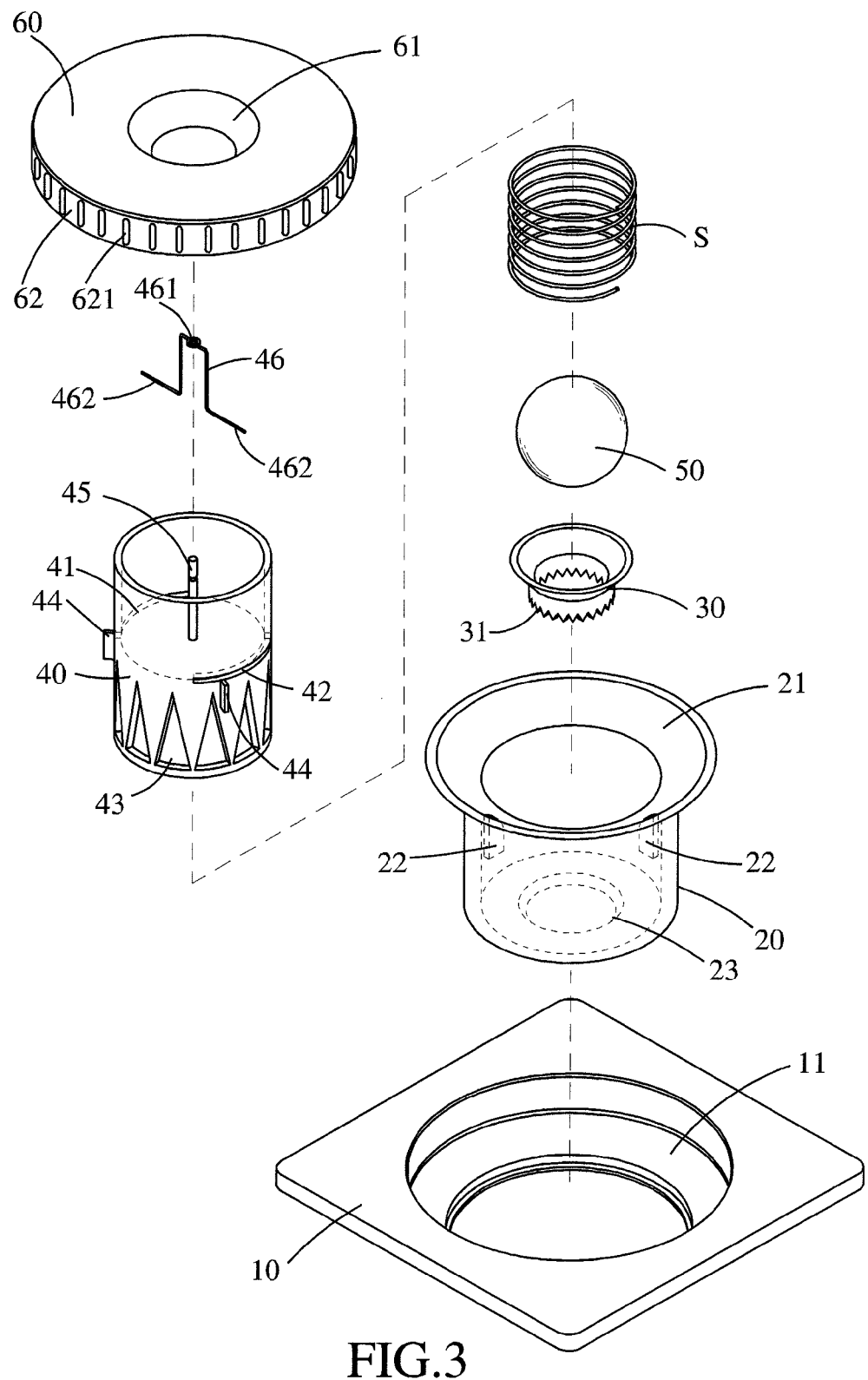
FIG. 3 is an exploded view of the drain valve device according to the first embodiment of the present invention.
Figure 4:
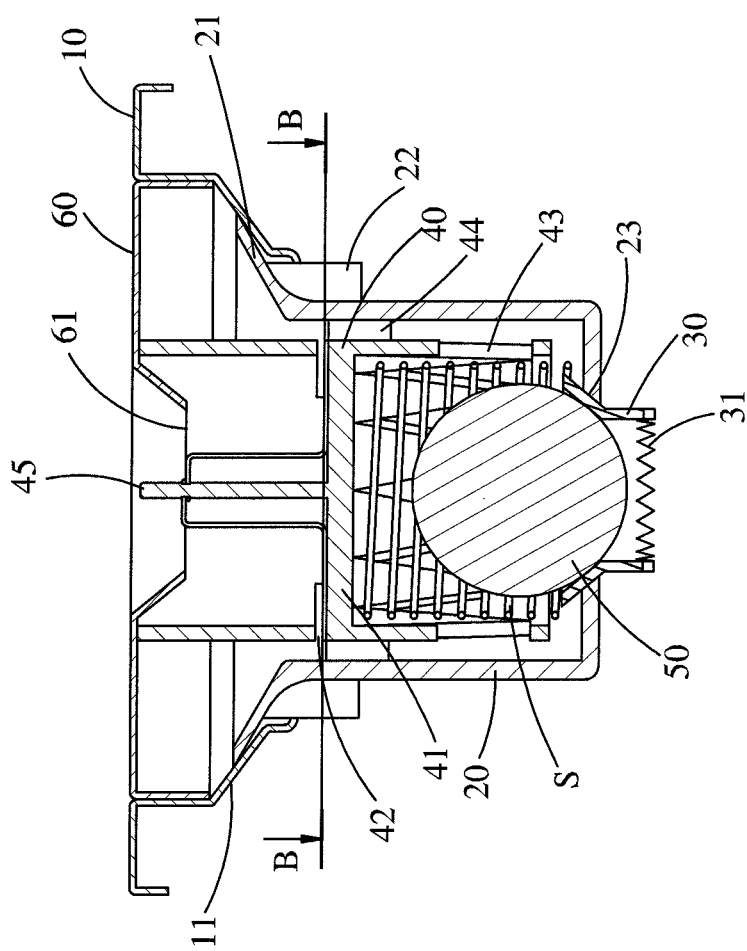
FIG. 4 is a cross-sectional view of the drain valve device assembled according to the first embodiment of the present invention.
Figure 5:
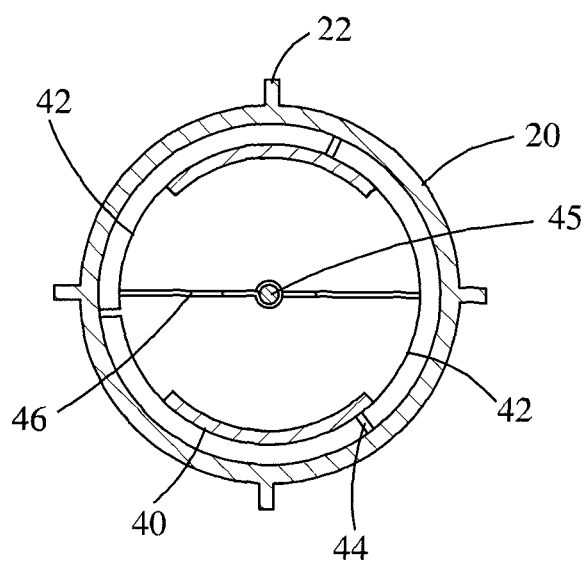
FIG. 5 is a cross-sectional view of the drain valve device taken along line B-B of FIG. 4.

The detailed structures and anticipated advantages of the present invention are illustrated hereunder with specific embodiments and drawings.

The present invention provides, in a first embodiment thereof, a drain valve device for use with a floor drain structure. Referring to FIG. 2 through FIG. 5, the drain valve device according to the first embodiment of the present invention is installed on a frame 10. The drain valve device comprises a base 20 and a control unit. The control unit comprises a drain element 30, a valve 40, a resilient component S, and a floating component 50.

The frame 10 is centrally hollowed out and extended downward to form an inner flange 11, and adapted to hold the base 20.

The base 20 is hollow and cylindrical. The top rim of the base 20 extends and expands outward to form an outer flange 21 which can rest on the inner flange 11 of the frame 10. The base 20 is peripherally equipped with a plurality of wings 22 which can abut against the inner wall of the frame 10 and thus function as a positioning structure whereby the base 20 is confined to the center of the frame 10. A tapered through hole 23 is disposed at the center of the bottom of the base 20.

The base 20 further comprises a cover 60 for covering the base 20. A drain vent 61 is centrally disposed at the cover 60. The cover 60 extends downward to form an annular protruding portion 62. A plurality of slits 621 is disposed at the circumferential side of the annular protruding portion 62 and adapted to allow water to pass through and filter out hair and residue.

Figure 8:
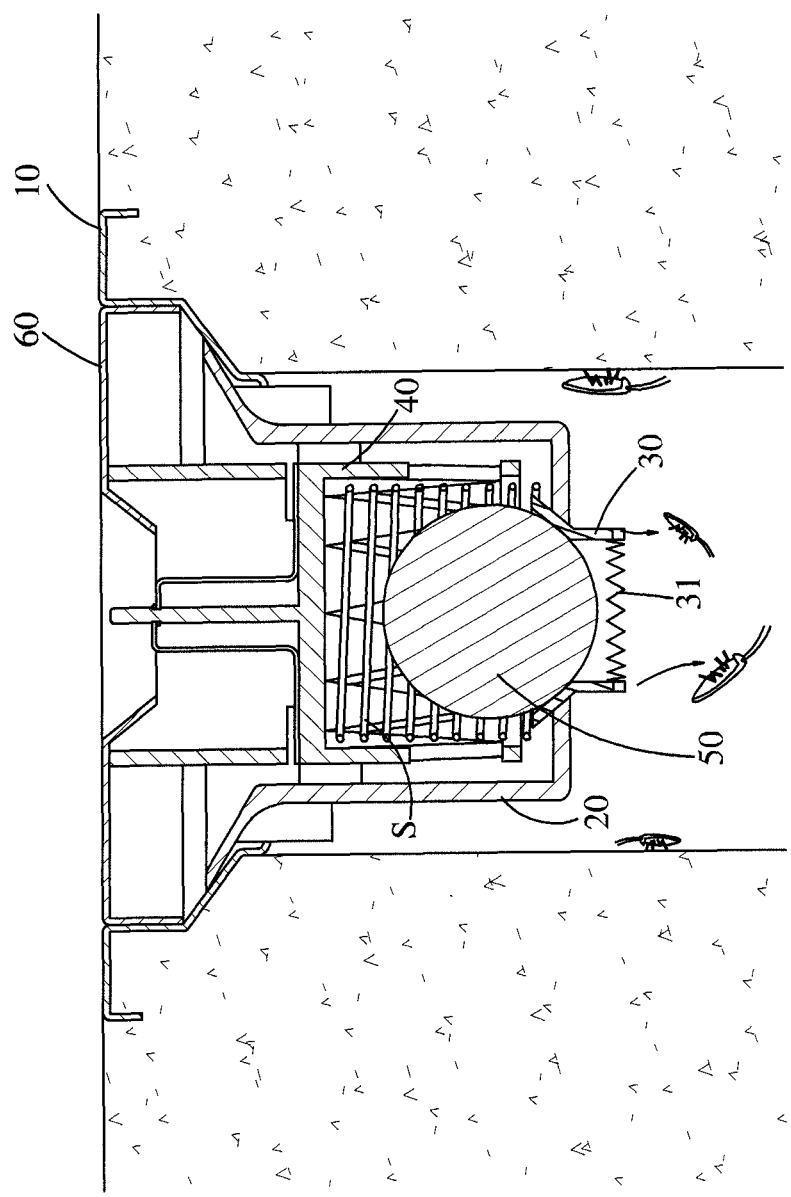
FIG. 8 is a schematic view of the drain valve device according to the first embodiment of the present invention, illustrating how the drain valve device prevents intrusion of cockroaches.

The upper portion of the drain element 30 is tapered and thereby adapted to be confined to the through hole 23 of the base 20. The bottom end of the drain element 30 is cylindrical and has a plurality of serrate portions 31 for preventing intrusion of cockroaches and mosquitoes from a drainpipe as shown in FIG. 8.

The valve 40 is hollow and cylindrical. A baffle board 41 is disposed inside the valve 40 and positioned midway to partition the inside of the valve 40 into a water storage space above and a receiving space below. At least one drain hole 42 is disposed at the periphery of the water storage space. In this embodiment, the drain holes 42 are in the number of two and are for use in draining water which might otherwise accumulate in the water storage space. The receiving space has a plurality of guide holes 43. The valve 40 peripherally forms a plurality of positioning ribs 44 whereby the valve 40 is disposed centrally in the base 20. The receiving space receives the resilient component S which exerts an upward force on the cover 60.

A post 45 is disposed on the baffle board 41 and disposed centrally in the water storage space to carry a hair collector 46. The hair collector 46 is made from a piece of iron wire bent in a manner to allow the hair collector 46 to consist of a sleeve 461 and two end pins 462 extending outward therefrom. The sleeve 461 can be disposed around the post 45. Hence, not only can leftovers, hair, and residue be retained in the water storage space, but the drain valve device is also easy to clean, as shown in FIG. 7.

According to the present invention, variants of the hair collector 46 are feasible. For instance, a hair collector made from a piece of iron wire bent in a manner to form a helical structure can be installed in the water storage space to press against the cover 60 and the baffle board 41 and held therebetween so as to effectuate filtration. Preferably, one end of the hair collector passes through the drain vent 61 of the cover 60.

The floating component 50 is substantially spherical in shape, has a diameter slightly larger than that of the through hole 23, and has a specific gravity less than 1 and thus floats in water. The floating component 50 is disposed above the drain element 30 and adapted to prevent intrusion of cockroaches, mosquitoes, and odor from the drainpipe.

Water introduced into the base 20 accumulates gradually in the water storage space of the valve 40. Once the weight of the accumulated water exceeds a resilient force of the resilient component S, the valve 40 will be moved downward under the weight of the accumulated water and thus guided into the base 20. As soon as the water reaches the bottom of the drain element 30, the floating component 50 becomes afloat automatically, thereby allowing the water to be drained into the drainpipe via the drain element 30, as shown in FIG. 6. Upon completion of drainage, the floating component 50 seals the drain element 30 again.

Hence, the drain valve device of the present invention is characterized in that a control unit disposed in a base 20, coupled with the amount of water entering the base 20, controls the drain valve device to open or shut. The drain valve device opens automatically as soon as the amount of water inside the base 20 exceeds a predetermined level. The drain valve device shuts automatically as soon as the amount of water inside the base 20 is less than a predetermined level.

The resilient component S of the present invention is a compression spring. An experiment is performed on the resilient component S, wherein a drainpipe with a diameter of 2 inches is laid at a vertical depth of 10 inches (known as the "background condition"). The result of the experiment indicates that, preferably, the resilient component S is compressed by a distance of 13 to 15 millimeters under the weight of water of 30 to 40 grams, such that the spring constant K is calculated to be $2 \times 10^{-3}$ to $3 \times 10^{-3}$ kgf/mm. A change in the background condition results in a change in the dimensions of the valve 40, the dimensions of the base 20, and the dimensions of the through hole 23 and thereby a change in the flow speed and the flow rate of water. Given the aforesaid relationship, if it is assumed that the water flow speed remains unchanged, the water flow rate will be directly proportional to the cross-sectional area of the drainpipe, and thus the compressed distance of the resilient component (that is, the distance between the top rim of the valve 40 and the bottom side of the cover 60) will be directly proportional to the drainpipe diameter. Hence, the spring constant K of the resilient component of the present invention is directly proportional to the drainpipe diameter (i.e., the diameter of the drain hole of the cover), whereas the diameter of the drain vent 61 of the cover 60 is also directly proportional to the diameter of the drainpipe.

As soon as the weight of the water accumulated in the water storage space decreases to less than the resilient force of the resilient component S, the top rim of the valve 40 pushes up and seals the drain vent 61, as shown in FIG. 6a.

Depending on water flow rate, the drain valve device of the present invention operates in two scenarios as follows:

Scenario 1

Referring to FIG. 6a, the flow rate of water entering the drain vent 61 is so low that the weight of water accumulated in the water storage space of the valve 40 is less than the resilient force of the resilient component S, and in consequence the top rim of the valve 40 presses against the cover 60; as a result, the water accumulated in the water storage space of the valve 40 is delivered to the bottom of the base 20 after passing through the at least one drain hole 42 and the guide holes 43, whereas the floating component 50 drifts upward automatically to thereby allow the water to be drained into the drainpipe. Upon completion of drainage, the drain element 30 shuts automatically.

Scenario 2

Figure 6B:
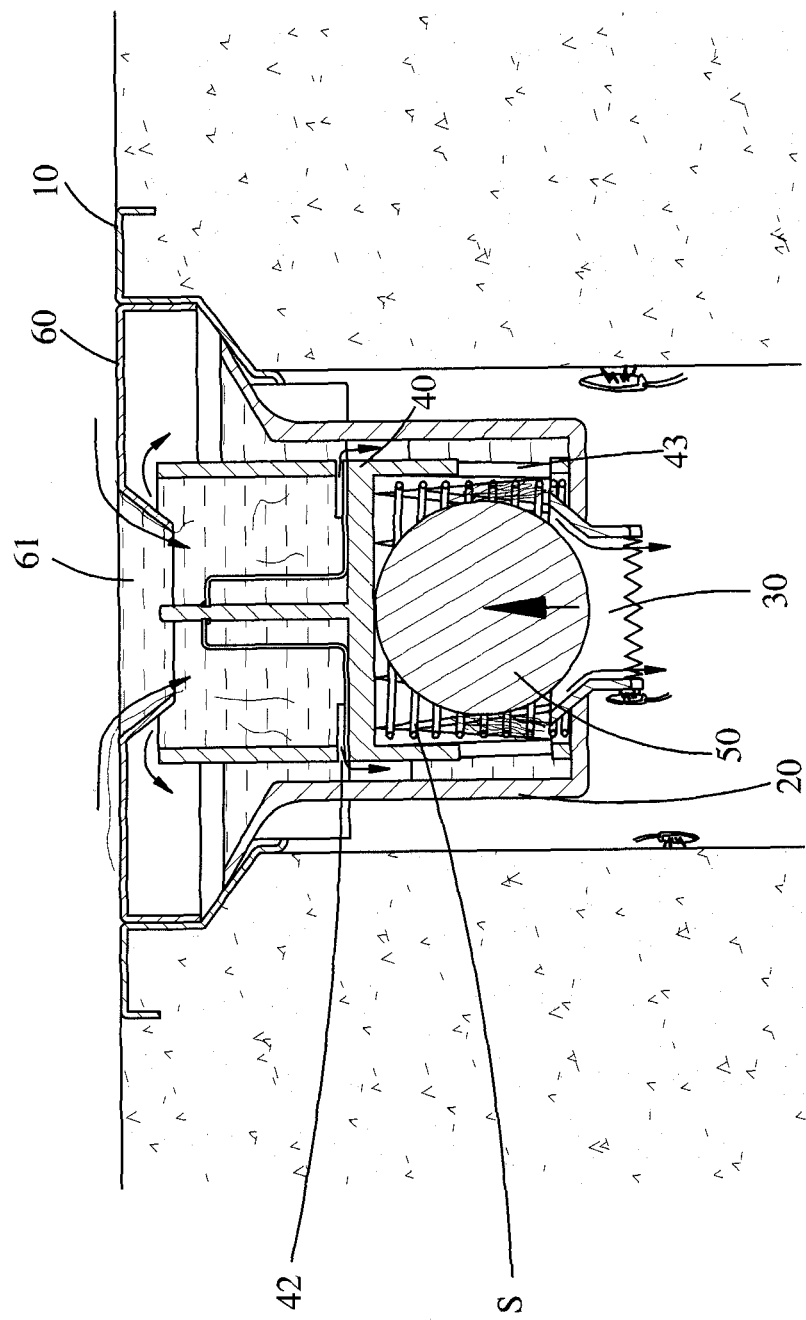
FIG. 6b is a schematic view of the drain valve device according to the first embodiment of the present invention, illustrating another mode of draining water with the drain valve device.

Referring to FIG. 6b, the flow rate of water entering the drain vent 61 is so high that the weight of water accumulated in the water storage space of the valve 40 is larger than the resilient force of the resilient component S, and in consequence the valve 40 moves downward; as a result, the water accumulated in the water storage space of the valve 40 flows over the top rim of the valve 40, passes through the gap between the valve 40 and the base 20, and is finally delivered to the bottom of the base 20 to thereby cause the floating component 50 to drift upward and allow the water to be drained into the drainpipe. Upon completion of drainage, the drain element shuts automatically.

In both of the two aforesaid scenarios, residue is filtered out of water and locked in the water storage space of the valve 40 effectively.

The control unit of the drain valve device is illustrated with a preferred embodiment of the present invention. In another embodiment of the present invention, the operation of the control unit relies solely upon the valve 40, the resilient component S, and the cover 60, as the control unit controls the drain valve device to open or shut, using the weight of the water accumulated in the water storage space to counterbalance the resilient force of the resilient component S. In yet another embodiment of the present invention, the control unit comprises a floating component, wherein one and only one said through hole 23 is disposed at the bottom of the base 20; once water accumulated in the base is sufficient to cause the floating component 50 to drift upward, the drain valve device will open and start to admit water; and, once water accumulated in the base 20 is insufficient to cause the floating component 50 to drift upward, the drain valve device will shut automatically.

Optionally, a filtering layer made of a porous material, such as sponge, is disposed in the drain hole 42 of the water storage space of the valve 40 and adapted to enhance filtration in the course of drainage of the accumulated water. A slender handle is coupled to each of the two sides of the floating component 50 and passes through the drain hole of the cover 60 and the through hole 23 of the base 20. A user can pull the slender handles by hand to adjust the position of the floating component S and thereby allow the floating component S to be positioned at the through hole 23 effectively.

Figure 9:
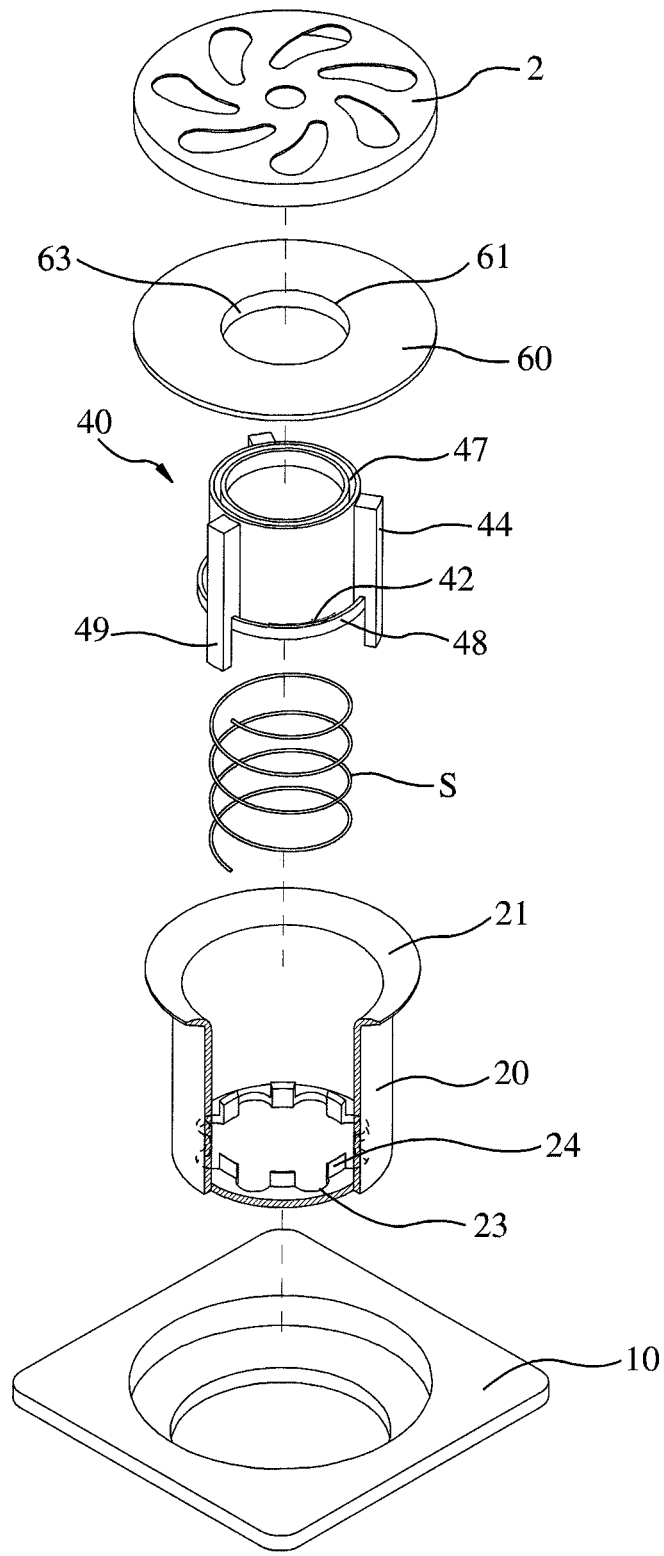
FIG. 9 is an exploded view of a drain valve device according to the second embodiment of the present invention.
Figure 10:
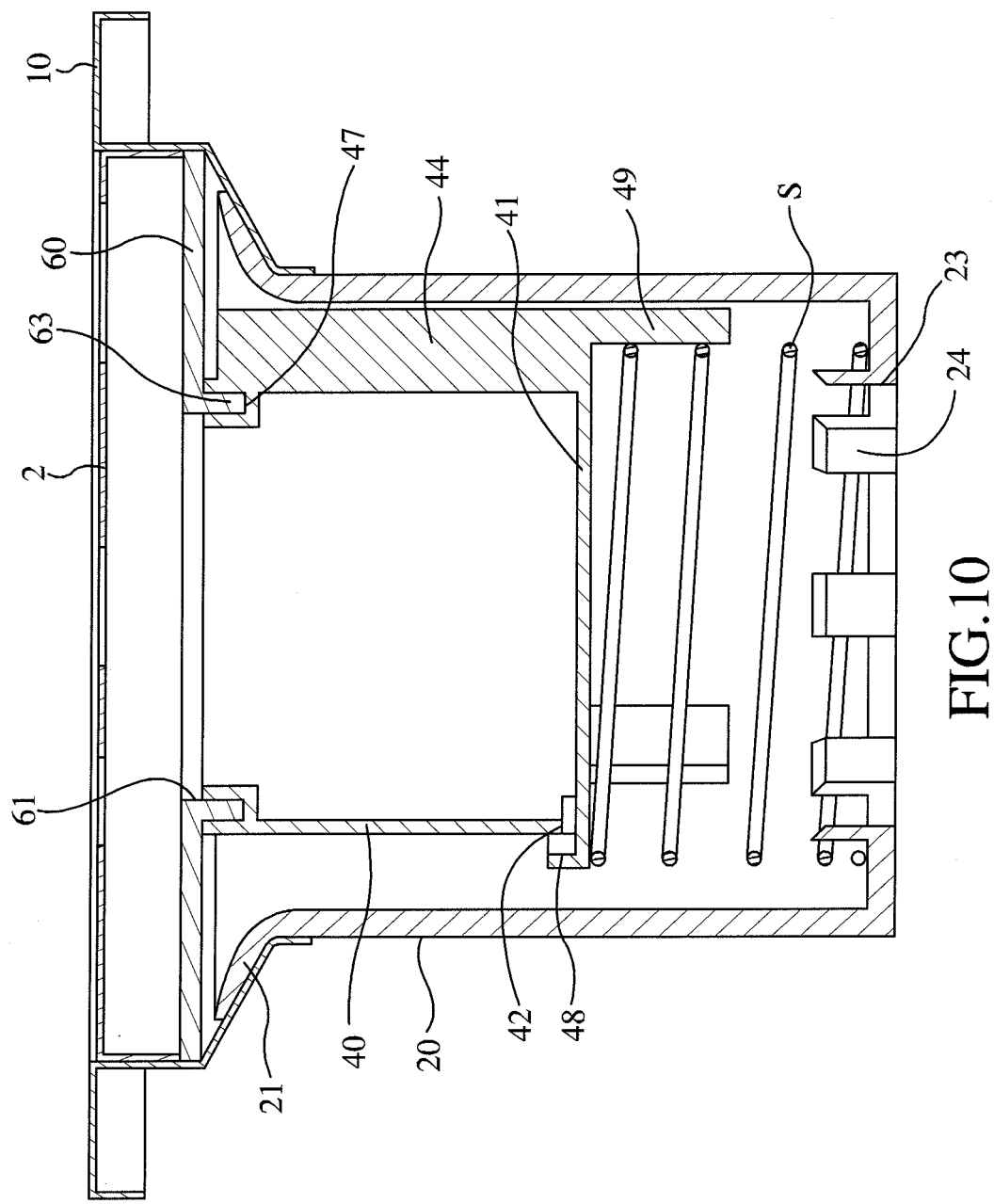
FIG. 10 is a cross-sectional view of the drain valve device assembled according to the second embodiment of the present invention.
Figure 11:
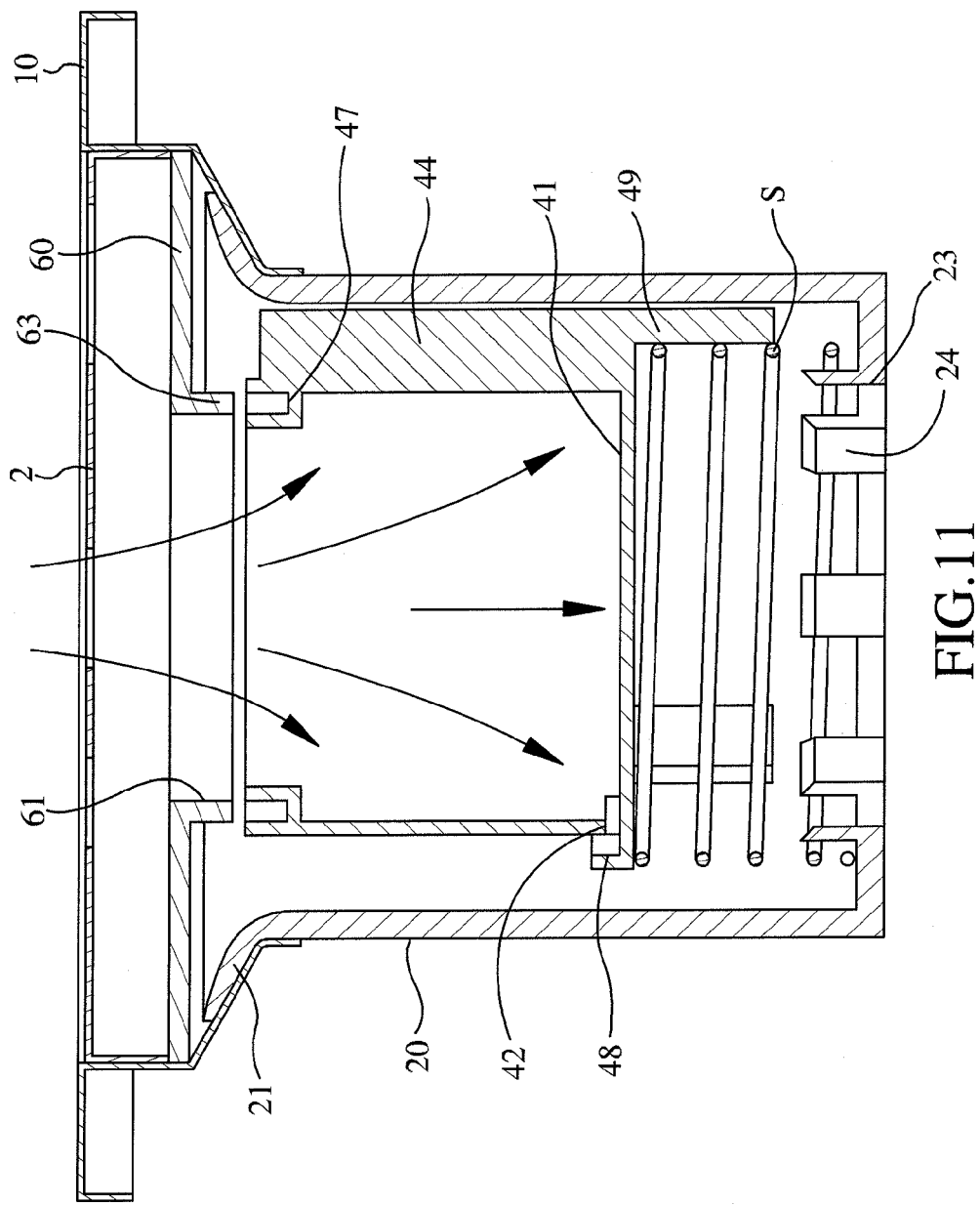
FIG. 11 is a schematic view of the drain valve device according to the second embodiment of the present invention, illustrating a mode of draining water with the drain valve device.

Referring to FIG. 9 through FIG. 11, the main structure of the second embodiment of the present invention is similar to the first embodiment of the present invention, and thus identical elements in the first and second embodiments are denoted with the same reference numeral to facilitate recognition thereof. In the second embodiment, the drain valve device comprises the base 20 and the control unit and is disposed between the frame 10 and a plate strainer 2. Distinguishing features of the second embodiment of the present invention are as follows.

The cover 60, which is tablet-shaped and has the drain vent 61, covers the base 20 from above. The cover 60 further extends downward to form a protruding edge 63 enclosing the drain vent 61.

The control unit comprises the valve 40 and the resilient component S. A first circumferential groove 47 is disposed at the top rim of the valve 40 and adapted to hold the protruding edge 63 of the cover 60 to thereby enhance the tight engagement between the valve 40 and the cover 60. The at least one drain hole 42 is disposed at the junction of the baffle board 41 and the water storage space of the valve 40. The baffle board 41 extends outward and bends upward to form a second circumferential groove 48 for hiding the at least one drain hole 42 partially at least. Hence, after water has entered the water storage space of the valve 40, the water is gradually drained through the at least one drain hole 42. The second circumferential groove 48 not only prevents hair and residue from passing through the at least one drain hole 42 along with the passing water, but also keeps a residual trace of water in the water storage space such that the residual trace of water forms a water seal that enhances the prevention of intrusion of odor and pests.

Furthermore, the valve 40 has a plurality of first positioning portions 49 formed by extending the positioning ribs 44 downward and adapted to enclose the resilient component S such that the top end of the resilient component S is fixed in place. The rim of the through hole 23 of the base 20 extends upward to form a plurality of second positioning portions 24 spaced apart from each other and protruding into the inside of the resilient component S such that the bottom end of the resilient component S is fixed in place.

Hence, in the second embodiment of the present invention, the first circumferential groove 47 and the second circumferential groove 48 of the drain valve device provide enhanced tight engagement, effectuate odor prevention, enhance filtration of hair and residue, and prevent intrusion of pests.

Figure 12:
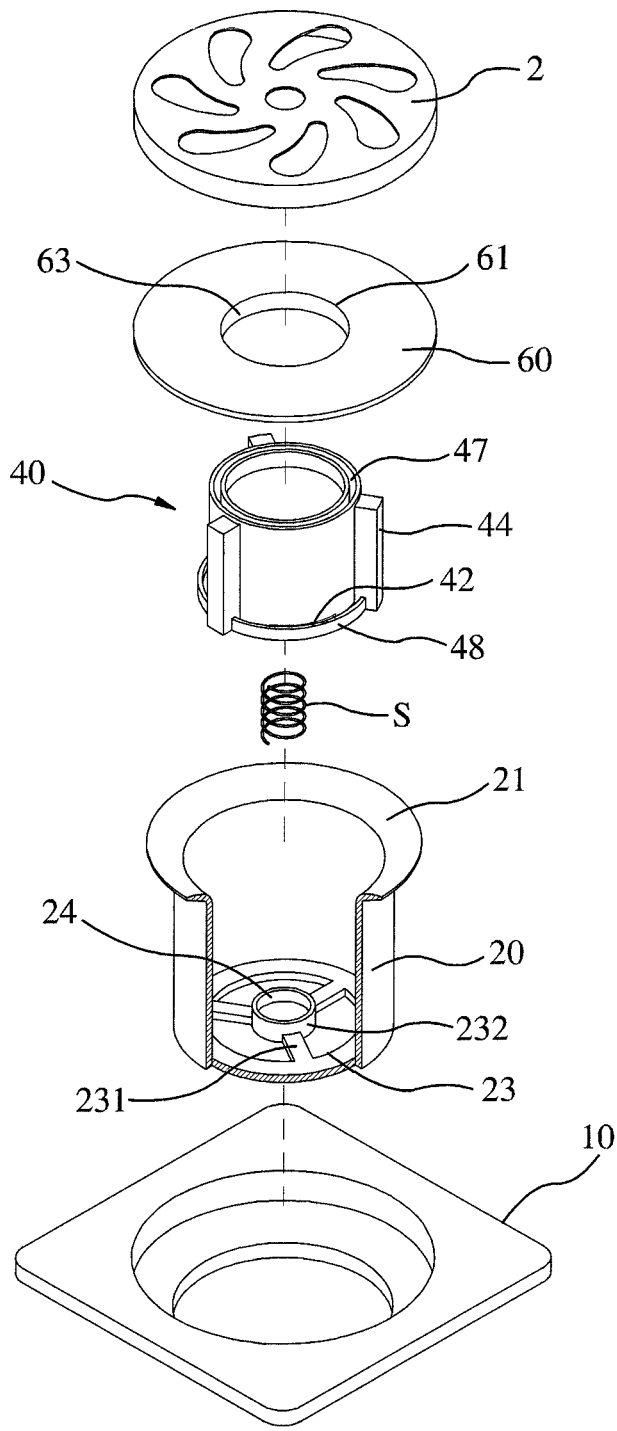
FIG. 12 is an exploded view of a drain valve device according to the third embodiment of the present invention.
Figure 13:
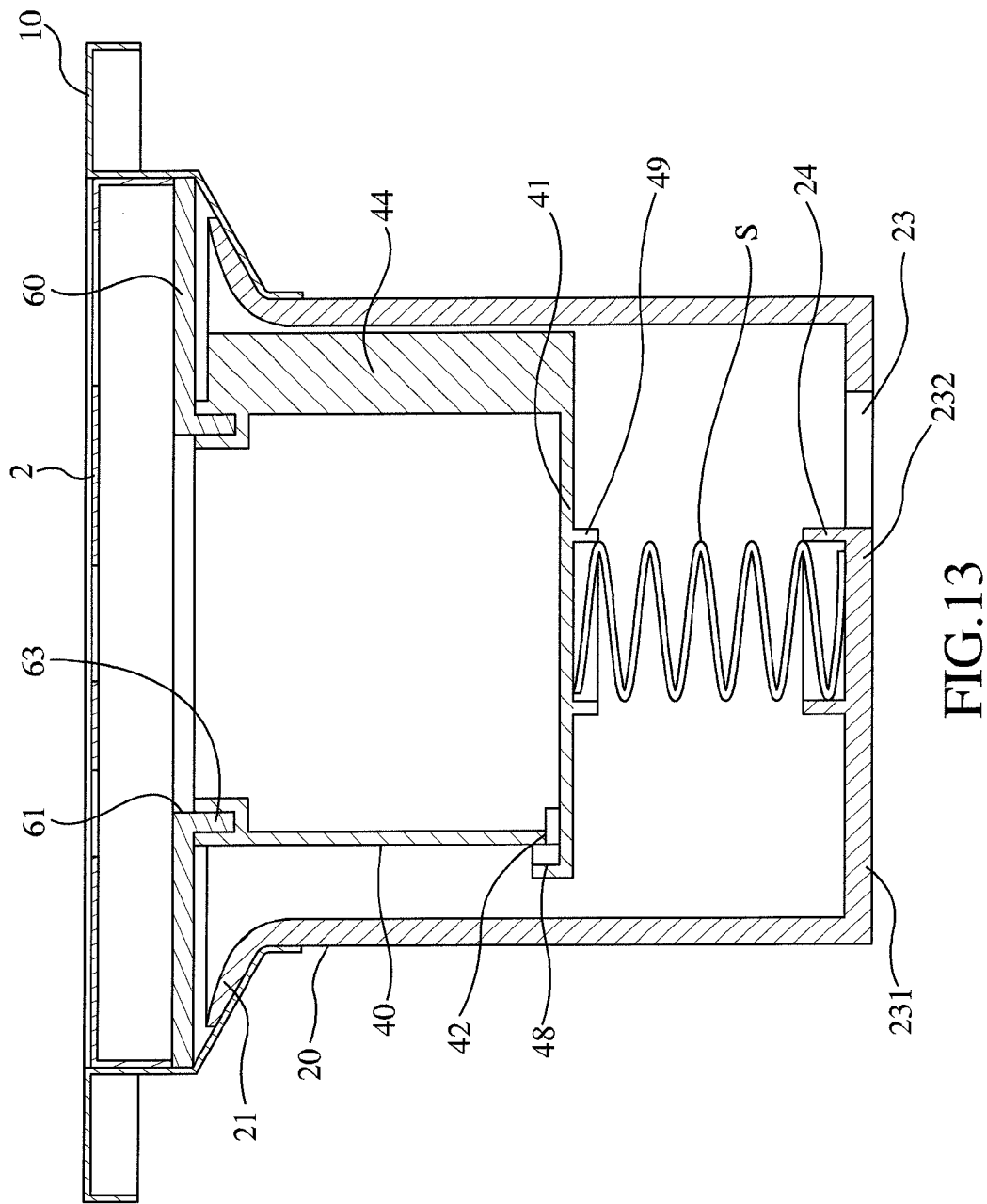
FIG. 13 is a cross-sectional view of the drain valve device assembled according to the third embodiment of the present invention.

Referring to FIG. 12 and FIG. 13, the third embodiment of the present invention is structurally distinguished from the second embodiment of the present invention by: the first positioning portions 49 are disposed at the bottom side of the baffle board 41 of the valve 40 and are circular; the through hole 23 at the bottom of the base 20 extends inward to form a plurality of supporting arms 231 for supporting a central bottom plate 232; the second positioning portions 24 protrude upward from the surface of the central bottom plate 232 and are circular; hence, the two ends of the resilient component S are fixed in place jointly by the first positioning portions 49 and the second positioning portions 24 in a desirable manner.

Figure 14:
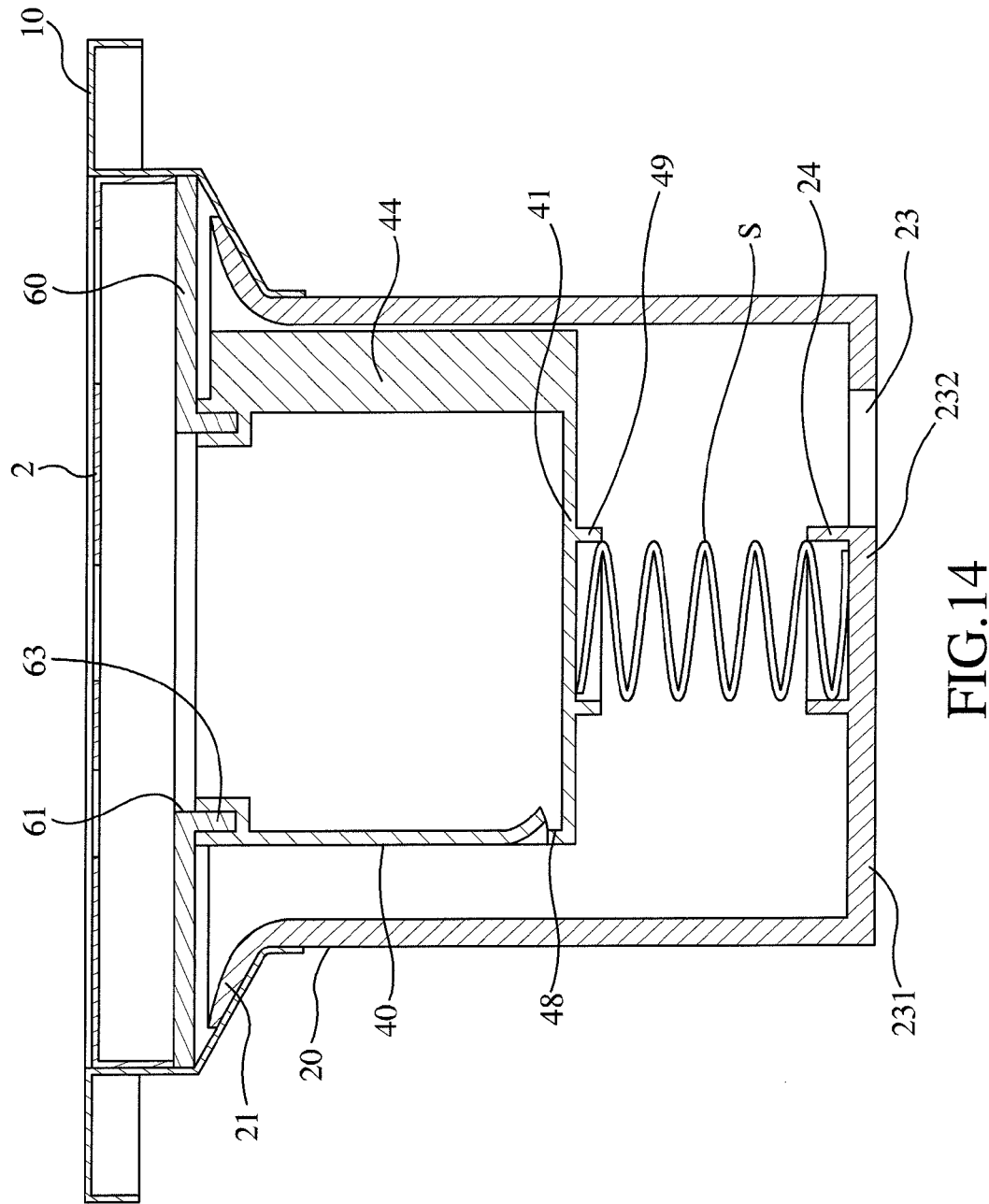
FIG. 14 is a cross-sectional view of the drain valve device assembled according to the fourth embodiment of the present invention.

Referring to FIG. 14, the fourth embodiment of the present invention differs from the third embodiment of the present invention in that, in the fourth embodiment, the baffle board 41 bends upward to form the second circumferential groove 48, whereas the wall surface attributed to the valve 40 and positioned proximate to the at least one drain hole 42 dents inward. Hence, the second circumferential groove 48 not only prevents hair and residue from passing through the at least one drain hole 42 along with the passing water, but also keeps a residual trace of water in the water storage space such that the residual trace of water forms a water seal that enhances the prevention of intrusion of odor and pests.

The drain valve device of the present invention can also be applicable to water tanks and bathtubs etc. It is because the drain valve device of the present invention can be for use in water storage, provided that a water seal is provided and adapted to seal the drain vent 61 of the cover 60 in the aforesaid embodiments.

In conclusion, the present invention provides a drain valve device with advantages, namely simple structure, ease of use, prevention of intrusion of odor and pests, easy to clean, and unlikely to get clogged.

What is claimed is:

1. A drain value device, comprising:
   a base being hollow and cylindrical and having a bottom at which at least one through hole is disposed;
   a cover disposed at the base and having a drain vent; and
   a control unit comprising a hollow cylindrical valve, the valve having a top rim corresponding in position to the drain vent, wherein a baffle board is disposed in the valve to partition into a water storage space above and a receiving space below, the receiving space receiving a resilient component holding between the baffle board and the base such that, as soon as an amount of water entering the water storage space exceeds a predetermined level, a resilient force of the resilient component is counterbalanced to thereby allow the valve to move downward and away from the cover, the resilient component being a compression spring with a spring constant of $2 \times 10^{-3}$ to $3 \times 10$ kgf/mm,
   wherein the cover is tablet-shaped and extends downward to form a flange enclosing the drain vent, and
   wherein a first circumferential groove is disposed at the top rim of the valve and adapted to hold the flange.

2. The drain value device of claim 1, wherein the cover further provides a water seal for sealing the drain vent.

3. The drain value device of claim 1, wherein the through hole of the base is in the number of one and has a rim extending upward to form second positioning portions spaced apart from each other such that a bottom end of the resilient component is fixed in place.

4. The drain value device of claim 3, wherein a plurality of supporting arms is disposed in the through hole of the base to support a central bottom plate, and the second positioning portions protrude upward from a surface of the central bottom plate and are circular.

5. The drain value device of claim 1, wherein a plurality of positioning ribs is disposed at a periphery of the valve.

6. The drain value device of claim 5, wherein the positioning ribs of the valve extend downward to form a first positioning portion enclosing a top end of the resilient component.

7. The drain value device of claim 5, wherein a first positioning portion is disposed on a bottom side of the baffle board and adapted to enclose a top end of the resilient component.

8. The drain value device of claim 1, wherein at least one drain hole is disposed at a periphery of the water storage space.

9. The drain value device of claim 8, wherein the baffle board extends outward and bends upward to form a second circumferential groove for hiding the at least one drain hole.

10. The drain value device of claim 8, wherein the at least one drain hole of the valve is disposed at a junction of the water storage space and the baffle board.

11. The drain value device of claim 10, wherein a wall surface attributed to the valve and positioned proximate to the at least one drain hole dents inward.

* * * * *